United States Patent [19]

Dennis

[11] 4,169,585

[45] Oct. 2, 1979

[54] WORKPIECE HOLDER

[75] Inventor: Ronald E. Dennis, Peoria Heights, Ill.

[73] Assignee: Caterpillar Tractor Co., Peoria, Ill.

[21] Appl. No.: 883,102

[22] Filed: Mar. 3, 1978

[51] Int. Cl.² .............................................. B23Q 3/14
[52] U.S. Cl. .............................. 269/48.1; 144/288 A
[58] Field of Search ............... 269/47, 48.1, 50, 229, 269/43; 228/44.5; 144/288 A; 279/2 R, 2 A

[56] References Cited
U.S. PATENT DOCUMENTS 3,741,457  6/1973  Gwin et al. ......................... 269/48.1

3,770,032  11/1973  Stull ................................. 144/288 A

FOREIGN PATENT DOCUMENTS 958923  12/1974  Canada ................................. 228/44.5

Primary Examiner—Robert C. Watson
Attorney, Agent, or Firm—John W. Grant

[57] ABSTRACT

A workpiece holder includes a plurality of elements movable radially outwardly into engagement with an inner surface of an annular workpiece in response to movement of a cam.

12 Claims, 2 Drawing Figures

Fig-1-

WORKPIECE HOLDER

BACKGROUND OF THE INVENTION

This invention relates to a workpiece holder for supporting an annular workpiece by engagement between radially extending elements of the workpiece holder and the inner surface of the workpiece.

In one process of making large tires for earthmoving vehicles, layers of rubber and wire are applied to the surface of a toroidal shaped hollow sand core which remains within the tire carcass during the construction of the tire. The sand core is eventually dissolved as one of the final steps in making the tire. The sand core is somewhat fragile and care must be taken so as not to apply excessive force thereto during the manufacturing operations. Excessive force could crush or otherwise cause the sand core to fail.

In the latter steps of the manufacturing process, tire materials, such as uncured rubber, breaker plys and belts are applied to the tire carcass as it is being rotated about its axis. Heretofore, the carcass has been supported during such rotation by an apparatus having shoes which grip the outer cylindrical surface of the carcass, during application of materials to the sidewalls. Application of tire materials to the crown area of the tire involves other fixturing and a separate carcass handling step. This is both time consuming and adds to the manufacturing cost.

Thus, it is desirable to support the tire carcass by gripping the inner surface so that tire materials can be applied to both the sidewalls and the crown area. One of the problems with gripping the tire carcass from the inside is that the sand core is more prone to breakage if excessive force is applied to the inner surface or if the force is applied unequally. Preferably, the gripping force applied to the inner surface should be only slightly greater than that required to support the tire carcass. However, this creates another problem in that normally one support apparatus is used for several sizes of sand cores wherein the weight of the carcass varies thereby requiring different gripping forces for each of the several sizes.

SUMMARY OF THE INVENTION

The present invention is directed to overcoming one or more of the problems as set forth above.

According to the present invention, this is accomplished by providing a workpiece holder having a plurality of elements slidably maintained by a support structure and which extend radially relative to a longitudinal axis of the support structure. A cam engages the inner ends of the elements and is movable along the longitudinal axis between a first position at which the elements are retracted and a second position at which the elements are extended into engagement with an inner surface of an annular workpiece.

DETAILED DESCRIPTION

Figure 1:
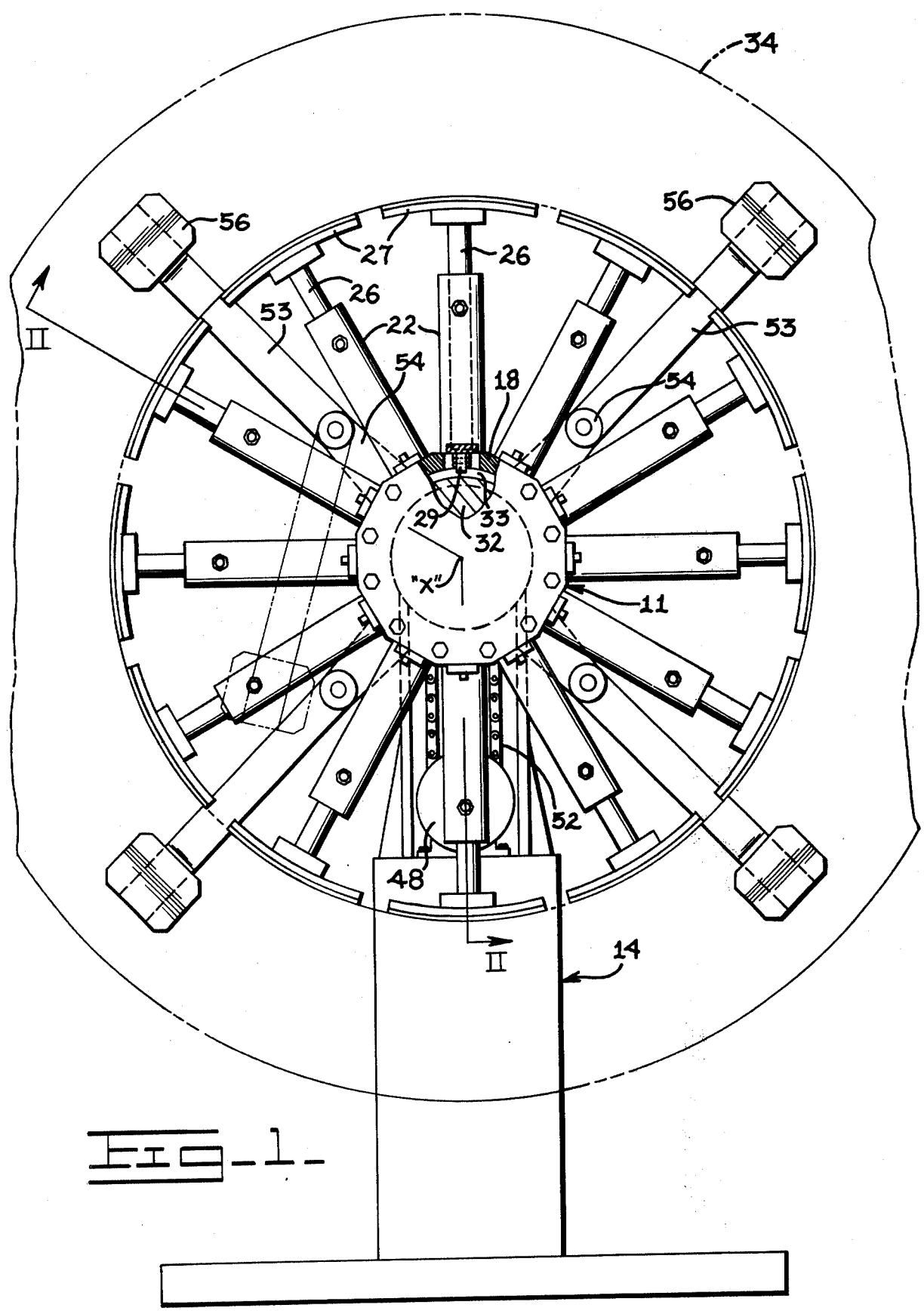
FIG. 1 is a diagrammatic elevational view of the workpiece holder of the present invention.
Figure 2:
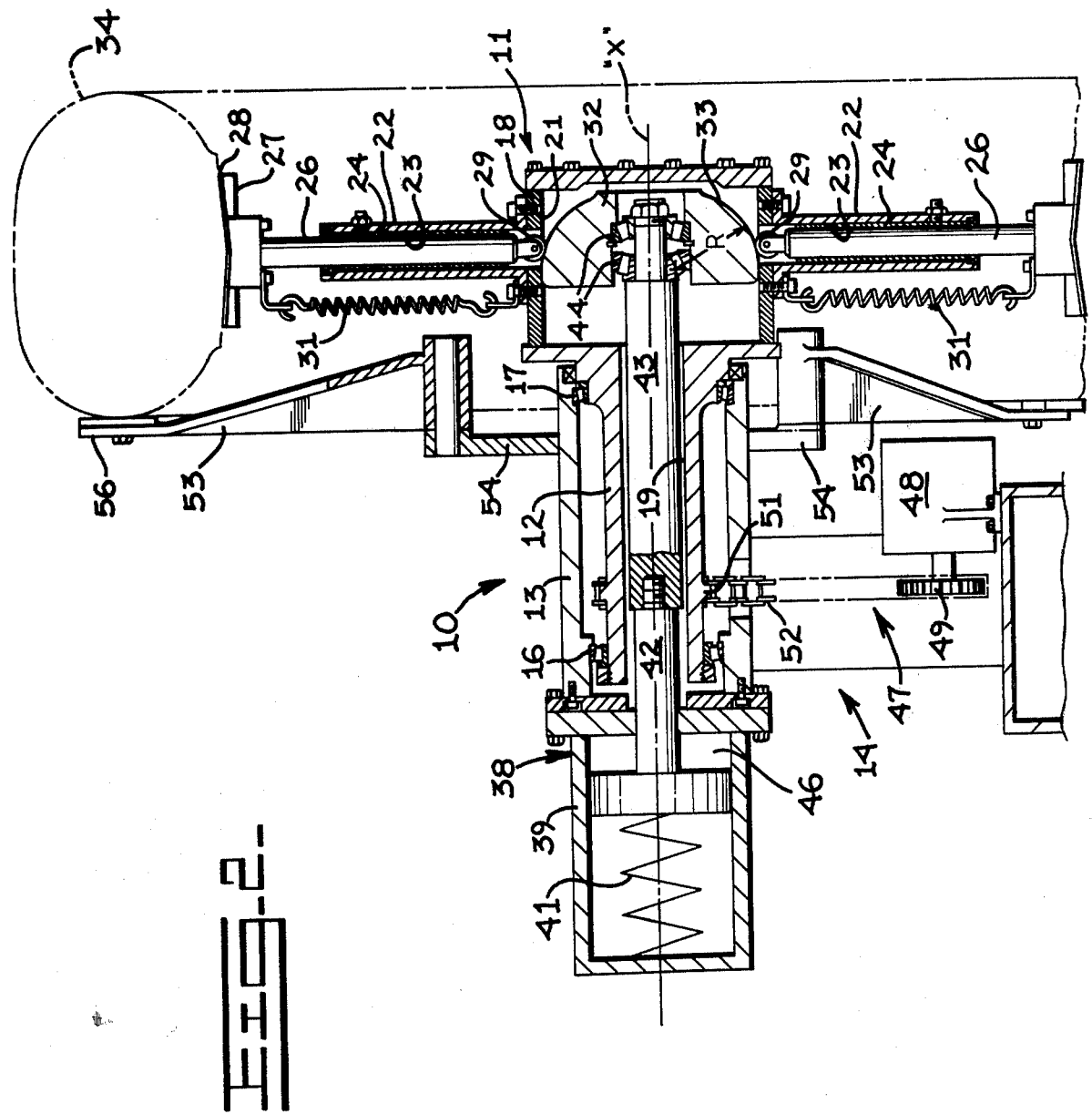
FIG. 2 is a sectional view taken along line II—II of FIG. 1.

Referring now to the drawings, a workpiece holder 10 includes a support structure 11 having a spindle 12 extending into preferably a hollow member 13 of a mounting frame 14. The spindle is rotatably connected to the member by a pair of bearings 16, 17. The spindle extends from a hub 18 and has a bore 19 therein extending along a longtiudinal axis "X." The bore 19 is concentric with and opens into a bore 21 in hub 18. A plurality of spokes 22 are connected to the hub and extend radially outwardly therefrom. Each of the spokes has a bore 23 therein opening into bore 21 of the hub 18. A bearing 24 is positioned within each of the bores in the spokes.

A plurality of elements, preferably rods 26, are individually slidably positioned within the bearings 24 in bores 23 of spokes 22. Each of the rods has an arcuate shoe 27 connected to its outer end portion with each shoe having a resilient pad 28 on the outer surface. Each of the rods has a roller 29 rotatably connected to the inner end portion thereof. A plurality of springs 31 are individually connected to the shoes 27 and to the hub 18 for resiliently retracting the rods from an extended position shown in the drawings toward the longitudinal axis.

A circular cam 32 is slidably positioned within the bore 21 and has a convex cam surface 33 in engagement with the rollers 29 at the inner end portions of the rods 26. The cam is movable along the longitudinal axis between a first position at which the rods are at a retracted position and a second position at which the rods are extended into engagement with an inner surface of a workpiece indicated at 34.

The convex cam surface 33 is defined as a surface of revolution in which a curved line is revolved about the axis "X." In the present invention, the curved line is an arc having a radius "R."

A means 38 is connected to the cam 32 for moving the cam between the first and second positions.

The means 38 can be, for example, a fluid cylinder 39 and a spring 41. The cylinder 39 is connected to the hollow member 13 and has a piston rod 42 extending into the bore 19. The piston rod is screwthreadably connected to one end of a rod 43 which has its other end connected to the cam by a pair of bearings 44. The bearings 44 provide for relative rotation between the cam 32 and rod 43. The spring 41 is preferably a constant rate spring and exerts a force on the piston rod 42 and rod 43 for urging the cam toward its second position. Selective introduction of fluid into a chamber 46 of the cylinder moves the piston rod and hence the cam to its first position.

A means 47 for rotating the support structure 11 relative to the mounting frame 14 includes a motor means 48, a drive sprocket 49 connected to the motor means, a sprocket 51 on the spindle 12 and a chain 52 entrained around the sprockets.

A plurality of arms 53 are pivotally connected to brackets 54 of the mounting frame 14. Each of the arms is movable from a first position at which a distal end portion 56 is at a position for locating the workpiece relative to the shoes 27 as shown by the solid lines in the drawings and a second position at which the distal end is free of contact with the workpiece, as shown by the phantom line in FIG. 1.

In use, fluid is introduced into the chamber 46 to retract the piston rod 42 of the cylinder 39 against the bias of spring 41. This in turn moves the cam 32 to its first position at which the rods 26 are retracted by the springs 31. With the arms 53 at their first position, the workpiece 34 is positioned so that the inner surface encircles the shoes 27. The fluid is then vented from the chamber 46 so that the spring 41 exerts a force against the piston rod 42 which in turn moves the cam 32 toward its second position. This movement of the cam causes the rollers 29 to follow the convex cam surface 33 of the cam thereby extending all the rods 26 simultaneously so that the shoes 27 engage the inner surface of the workpiece and center the workpiece 34 relative to the axis "X."

The relative position of rods 26 on the convex cam surface 33 and the available force of the spring 41 at the instantaneous position of cam 32 determines the amount of radial force being exerted against the workpiece. Specifically, the convex cam surface functions as a variable angle ramp such that the ramp angle decreases as the cam moves toward the second position. The increase in radial force caused by the decrease in ramp angle more than offsets the decrease in radial force caused by the decrease in the available force of the spring 41 as it expands with the net result being that the force exerted by the rods increases as the rods are extended in response to the cam moving to its second position. Thus, the force exerted against the workpiece increases as the diameter of the inner surface of the workpiece increases. Since the diameter of the inner surface is generally indicative of the size and weight of the workpiece, a greater force is automatically exerted against a larger and heavier workpiece while a lesser force is exerted against a smaller and lighter workpiece.

Prior to rotating the support structure 11 and hence the workpiece 34, the arms 53 are moved to their second position.

To remove the workpiece 34 from workpiece holder 10, fluid is again introduced into chamber 46 for moving cam 32 to its first position.

In view of the foregoing, it is readily apparent that the structure of the present invention provides an improved workpiece holder for supporting an annular workpiece. The rods are moved radially outwardly in unison by the cam so that the force exerted by the rods is uniformly distributed against the inner surface of the workpiece. Further, since the amount of radial force exerted against the inner surface by the rods increases as the rods are extended, a greater force is automatically exerted against a larger heavier workpiece than is exerted against a smaller lighter workpiece. Thus, the workpiece holder can suitably support any of several sizes of workpieces without any modification or adjustment thereto during changing of workpiece sizes.

Other aspects, objects and advantages of this invention can be obtained from a study of the drawings, the disclosure and the appended claims.

The embodiments of the invention in which an exclusive property or privilege is claimed are defined as follows:

1. A workpiece holder for supporting an annular workpiece having an inner surface, comprising:
   a support structure having a longitudinal axis;
   a plurality of elements having inner and outer end portions and being slidably maintained by said support structure;
   a cam engaging said inner end portions of said elements and being movable along the longitudinal axis between a first position at which the elements are at a retracted position and a second position at which the elements are extended into engagement with said inner surface of the workpiece;
   means for moving the cam between said first and second position; and
   a bearing rotatably connecting said cam moving means to said cam.

2. The workpiece holder of claim 1 wherein said cam has a convex camming surface, said inner end portions of the elements being in contact with the convex cam surface.

3. The workpiece holder of claim 2 wherein said cam moving means includes means for exerting a force against the cam for moving the cam from the first position to the second position.

4. The workpiece holder of claim 3 wherein said force exerting means includes a constant rate spring, said cam moving means includes a fluid cylinder connected to said cam for moving the cam from the second position to the first position.

5. The workpiece holder of claim 1 wherein said support structure includes a bore concentric with said axis, said cam being slidably positioned within said bore.

6. The workpiece holder of claim 1 wherein said support structure includes a plurality of spokes each having a bore extending radially relative to said axis, said elements being rods slidably positioned within the bores in the spokes.

7. The workpiece holder of claim 1 wherein the outer end portions of the elements each include an arcuate shoe.

8. The workpiece holder of claim 1 wherein the inner end portions of the elements each include a roller rotatably connected to the element and rollably engaging said cam.

9. The workpiece holder of claim 1 including resilient means connected to the elements for moving the elements to the retracted position in response to the cam being moved to said first position.

10. The workpiece holder of claim 1 including a mounting frame, means for rotatably connecting the suppport structure to the mounting frame, and means for rotating the support structure relative to the mounting frame.

11. A workpiece holder for supporting an annular workpiece having an inner surface, comprising:
    a support structure having a longitudinal axis;
    a plurality of elements having inner and outer end portions and being slidably maintained by said support structure;
    a cam engaging said inner end portions of said elements and being movable along the longitudinal axis between a first position at which the elements are at a retracted position and a second position at which the elements are extended into engagement with said inner surface of the workpiece;
    means for moving the cam between said first and second positions;
    a mounting frame;
    means for rotatably connecting the support structure to the mounting frame;
    means for rotating the support structure relative to the mounting frame; and
    a bearing rotatably connecting said cam moving means to said cam.

12. The workpiece holder of claim 11 including a plurality of arms pivotally connected to said frame and having distal end portions, said arms being movable between a first position at which said distal end portions are positioned for engagement with said workpiece and a second position at which the distal ends are at a position free of contact with the workpiece.

* * * * *

UNITED STATES PATENT AND TRADEMARK OFFICE
CERTIFICATE OF CORRECTION

PATENT NO. : 4,169,585
DATED : October 2, 1979
INVENTOR(S) : Ronald E. Dennis

It is certified that error appears in the above–identified patent and that said Letters Patent are hereby corrected as shown below:

Claim 10, line 1, delete "1" and insert ---4---.

Signed and Sealed this

Fifteenth Day of July 1980

[SEAL]

Attest:

SIDNEY A. DIAMOND

Attesting Officer — Commissioner of Patents and Trademarks